(12) United States Patent
Yorio et al.

(10) Patent No.: US 7,330,178 B2
(45) Date of Patent: Feb. 12, 2008

(54) DISPLAY-INPUT APPARATUS FOR A MULTI-CONFIGURATION PORTABLE DEVICE

(75) Inventors: Rudy Yorio, Pompano Beach, FL (US); David S. Fredley, Coral Springs, FL (US); Douglas W. Moskowitz, Weston, FL (US); James L. Tracy, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 706 days.

(21) Appl. No.: 10/835,681

(22) Filed: Apr. 30, 2004

(65) Prior Publication Data

US 2005/0243069 A1    Nov. 3, 2005

(51) Int. Cl.
*G06F 3/02* (2006.01)
*G02F 1/1343* (2006.01)
*C09K 19/02* (2006.01)

(52) U.S. Cl. .................. 345/169; 345/156; 345/168; 345/173; 349/12; 349/115; 349/142; 349/185; 349/201

(58) Field of Classification Search .................. 345/87, 345/156, 168, 169, 173; 349/11, 115, 185, 349/201, 12, 149
See application file for complete search history.

(56) References Cited

U.S. PATENT DOCUMENTS

| | | | | |
|---|---|---|---|---|
| 4,260,224 A | * | 4/1981 | Takayama | .................... 349/83 |
| 6,292,243 B1 | * | 9/2001 | Shingu et al. | ............... 349/122 |
| 6,735,009 B2 | * | 5/2004 | Li | .............................. 359/245 |
| 6,833,885 B2 | * | 12/2004 | Hisamitsu et al. | ............ 349/74 |
| 6,895,259 B1 | * | 5/2005 | Blank nee Keller et al. | .......................... 455/566 |
| 2005/0024319 A1 | * | 2/2005 | Amirzadeh et al. | ......... 345/104 |
| 2005/0091431 A1 | * | 4/2005 | Olodort et al. | ............... 710/72 |

* cited by examiner

*Primary Examiner*—My-Chau T. Tran
(74) *Attorney, Agent, or Firm*—Scott M. Garrett

(57) ABSTRACT

A portable electronic device includes a display-input apparatus (108) for displaying alternate character sets, in correspondence with a selected mode of operation of the device. The display-input apparatus uses first and second cholesteric display layers (302, 304) to display the different character sets. Each cholesteric display layer displays a different character set when active. When not active, the cholesteric display layer is rendered transparent.

12 Claims, 3 Drawing Sheets

DISPLAY-INPUT APPARATUS FOR A MULTI-CONFIGURATION PORTABLE DEVICE

TECHNICAL FIELD

This invention relates in general to user interface devices, and more particularly to soft display keypads and buttons for use with devices where the keypad or button can be used for more than one mode of operation.

BACKGROUND OF THE INVENTION

Electronic devices are in widespread use throughout the world, and portable electronic devices such as cellular radio telephones and personal data organizers are also used in increasing frequency. In many instances people may have several of these devices for performing different tasks. From a user's perspective, it would be much more convenient to have such devices integrated into one device. Integration would eliminate having to maintain separate accessories, batteries, and so on, and carrying one device is more convenient than carrying several devices for separate functions. One problem that has arisen in considering ways to integrate such devices into one device is the ergonomics of the user interface. For example, users have come to expect a cellular radio telephone to have a numeric keypad, with several alphabetic characters available on the digit keys for text entry. Conversely, users of so called two-way pagers and palm-top computers are accustomed to more conventional "QWERTY" keypads, having a layout similar to that of a computer keyboard and typewriters.

Manufacturers of electronic devices often manufacture the devices for sale in more than one world market, and consequently often have different keypads or buttons made with language or characters corresponding to the language prevalent in a particular region. This necessitates having an inventory of different parts for keypads and button, as well as maintaining separate "kits" for tracking the devices once they are assembled to assure the right kit goes to the intended market.

It would be of substantial benefit if, on an integrated device that performs several functions, the user interface provided a keypad entry apparatus that could adapt in accordance with the mode of operation of the device. Ideally the keypad could change appearance and provide a familiar interface to the user for each mode of operation. Therefore there is a need for an adaptable input apparatus for use with a multimode electronic device.

DETAILED DESCRIPTION OF A PREFERRED EMBODIMENT

Figure 1:
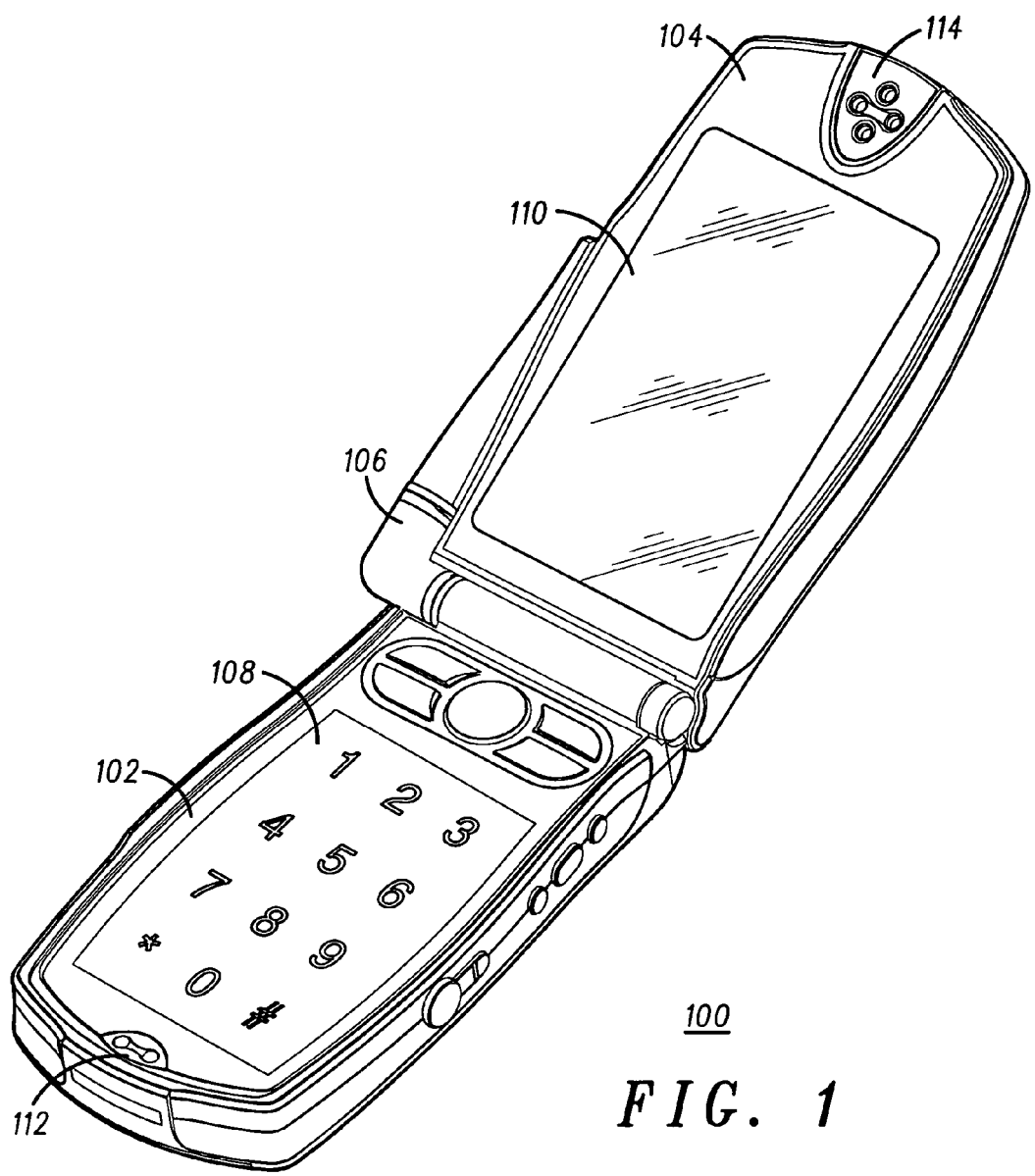
FIG. 1 shows a multi-configuration portable electronic device with a display-input apparatus in accordance with an embodiment of the invention, arranged in a first configuration.

While the specification concludes with claims defining the features of the invention that are regarded as novel, it is believed that the invention will be better understood from a consideration of the following description in conjunction with the drawing figures, in which like reference numerals are carried forward.

The invention solves the problems associated with the prior art by providing at least two cholesteric display layers arranged coincidently for alternately displaying information. Each cholesteric display layer is used to display a different character, symbol, or image set, or combinations thereof, in correspondence with a mode of operation of the portable electronic device. Furthermore, the mode of operation may be dependent on a physical configuration of the portable electronic device. The character or symbol set displayed by each cholesteric display layer is hard etched into the display backplane, unlike matrix type displays which require, typically, two layers of backplane to provide pixilation that can be selectively turned on or off to create symbols or characters. By using a single display backplane to produce characters and other symbols, the cost of fabricating the display may be reduced compared to conventional displays.

Figure 2:
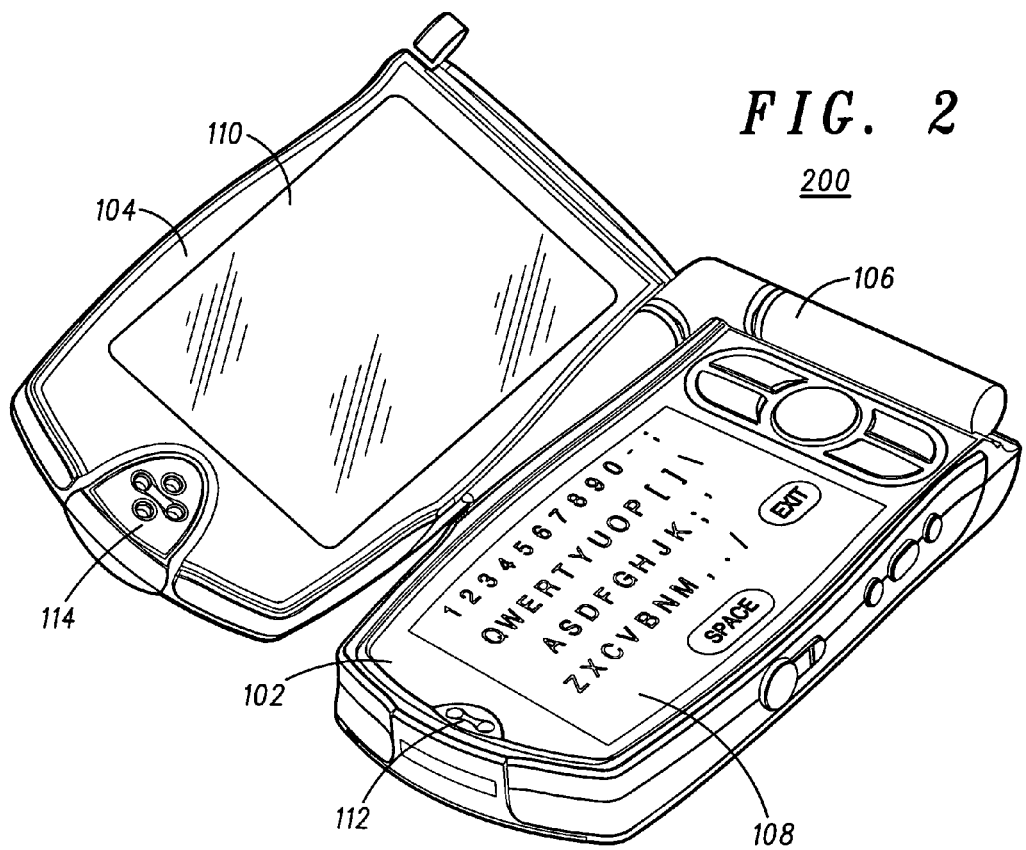
FIG. 2 shows a multi-configuration portable electronic device with a display-input apparatus in accordance with an embodiment of the invention, arranged in a second configuration.

Referring now to FIGS. 1 and 2, there are shown, respectively, a multi-configuration portable electronic device arranged in a first configuration 100 and a second configuration 200, in accordance with one embodiment of the invention. The device comprises at least a first body element 102 and a second body element 104. The body elements are moveable with respect to each other so that they device can be arranged in different physical configurations. The movement of the body elements may be facilitated by, for example, an elbow hinge assembly 106. The device may be configured into difference form factors corresponding to modes of operation. For example, in FIG. 1 the device is shown configured in a typical cellular phone configuration, and in FIG. 2 as a typical two-way messaging configuration. The first body element 102 has a display-input apparatus 108 disposed therein. The display-input apparatus is a display and input detection means that display selection choices and other information to the user, and detects input from the user to subsequently undertake an action indicated by the input. The display-input apparatus displays a first character set when the portable electronic device is operated in the first configuration, and it displays a second character set when the portable electronic device is operated in the second configuration as shown, respectively, in FIGS. 1 and 2. In one embodiment of the invention, the first character set and the second character set have different orientations so that they are normally viewed from different directions when the device is configured in different configurations. To facilitate communication, the device comprises a microphone 112 and an earpiece speaker 114. The second body element comprises a display element 110 for displaying information to a user of the device. The display element 110 is a general purpose display device that can display a wide variety of characters, symbols, and images, by selectively activating pixels of the display element, as is known in the art.

The first and second character sets are displayed in correspondence with the mode of operation of the device, as dictated by the configuration or orientation of the device. The character set that appears on the display-input apparatus corresponds to characters and functions that would normally be needed to operate a device that performs the function normally associated with the present configuration of a multi-configuration device, or the present use-orientation of a multi-orientation monolithic device. For example, if the device is operated in a phone mode, as shown in FIG. 1, the first character set displays a typical phone keypad, including the digits 0-9 and other special function keys. The user of the device then touches the display-input apparatus at the appropriate location to enter or select the character shown.

In a different configuration, such as the configuration of a messaging device, as depicted in FIG. 2, a different character set is displayed on the display-input apparatus for use with a messaging device, for example. In one embodiment of the invention the character sets are viewed from different orientations. The characters may be coincident, meaning that in one mode a first character is displayed at a particular location, and in another mode a different character from a different character set is displayed at that location, and possibly having a different orientation.

Figure 3:
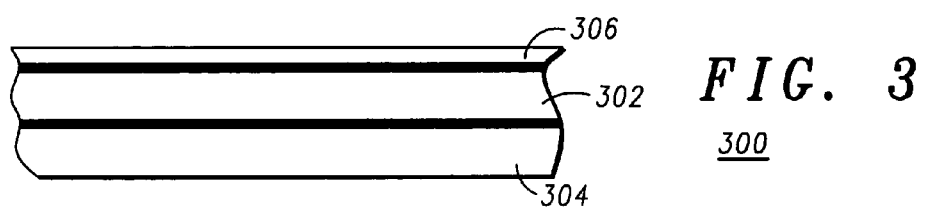
FIG. 3 shows a side cut-away view of display-input apparatus in accordance with an embodiment of the invention.

To display two different character sets, two different display layers are used. Referring now to FIG. 3, there is shown a side cut-away view 300 of display-input apparatus in accordance with an embodiment of the invention. The display-input apparatus comprises a first cholesteric display layer 302, and a second cholesteric display layer 304. Each of the cholesteric display layers comprise two substrate layers with cholesteric liquid crystal disposed therebetween. The cholesteric liquid crystal can be controlled through the application of electric fields to be light reflective (opaque) or light transmissive (transparent). By selectively applying the electric field, such as by the use of appropriately shaped conductor elements, shapes in the form of characters can be created by causing the cholesteric liquid crystal in the electric field to have the opposite luminous property from surrounding cholesteric liquid crystal. Initially, all of the cholesteric liquid crystal is in a homogeneous state, either transmissive or reflective. Then an electric field is applied to select regions via shaped conductor elements which cause the cholesteric liquid crystal between the conductor element and a backplane conductor the change mode from the surrounding cholesteric liquid crystal. However, in order to see characters formed in the second cholesteric display layer, the first cholesteric display layer must be placed in a transmissive mode, otherwise the second cholesteric display layer cannot be seen. In embodiments where tactile input detection is necessary, a conventional transparent touch screen overlay 306 may be used to determine the location of tactile input, and correlate it with character location, as is well known.

Figure 4:
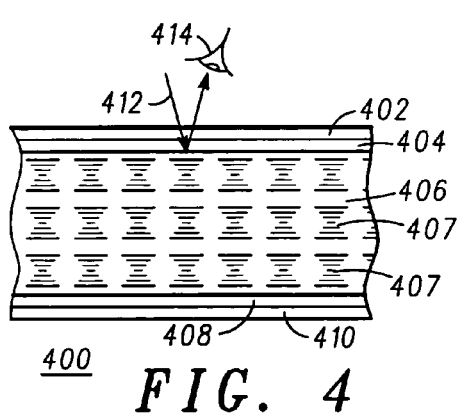
FIG. 4 shows a side cut-away view of a cholesteric display layer in a reflective state.
Figure 5:
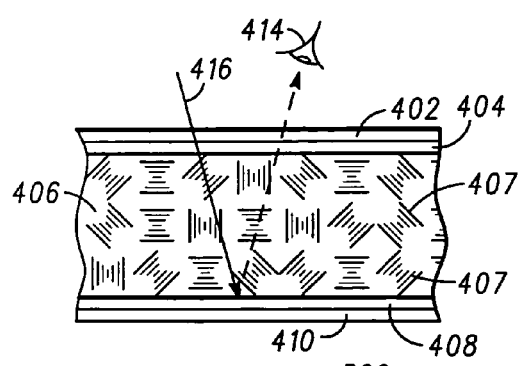
FIG. 5 shows a side cut-away view of a cholesteric display layer in a transmissive state.

Referring now to FIGS. 4 and 5, which show, respectively, a side cut-away view of a cholesteric display layer in a reflective state 400, and a side cut-away view of a cholesteric display layer in a transmissive state 500. A cholesteric liquid crystal medium 406 including cholesteric molecules 407 is disposed between a first substrate layer 402 and a second substrate layer 410. Disposed on the substrates are a first conductor layer 404 and a second conductor layer 408. The substrate layers are preferably both made of a transparent barrier material such as glass, for example. It is necessary that the first substrate layer be transparent so that the cholesteric liquid crystal medium can be viewed, or viewed through, as needed. Furthermore, it is preferable that both conductor layers be made of a transparent conductor material, such as indium tin oxide. At least one of the conductor layers includes character-shaped conductor elements for forming characters, symbols, images, or other indicia to be displayed to the user. In one embodiment of the invention, the first and second cholesteric display layers have a common electrical plane disposed them so as to reduce the number of transparent conductor layers needed.

Thus, the display operates differently from conventional display devices which typically have a matrix of conductors to form pixels, which can be selectively energized in conjunction with adjacent pixel elements to form images. However, the conventional approach requires a large number of addressable elements and logic to turn on and off pixels. An advantage of the present invention is that by using character shaped conductor elements, and entire character set can be displayed by electrifying a single conductor line, which is electrically connected to each character shaped conductor element, thus eliminating the need for costly display logic and multiple conductor layers to form the pixel matrix.

The cholesteric liquid crystal medium 406 includes a liquid crystal composition along with chiral doping agents to produce molecules having a spiral pitch induction. In the reflective mode the molecules 407 have a common alignment, as shown in FIG. 4. As such, certain wavelengths of light 412 incident to the cholesteric liquid crystal medium 406 are reflected and can been seen by a user 414. To permit light to transmit through the medium, an electric field is utilized to randomize molecule orientation, as shown in FIG. 5. By randomizing the molecule orientation, or at least reorienting them so as to not be reflective at the angle normally viewed by a user, incident light 416 passes through the medium 406 and may be reflected by something behind or below the medium, which is then seen by the user 414. The wavelength of light reflected by the medium may be determined by selecting the spiral pitch through the use of chiral doping agents, as is known in the art. Thus, in accordance with an embodiment of the invention, the first cholesteric display layer may appear to be a first color, and the second cholesteric display layer may appear to be a second color.

Figure 8:
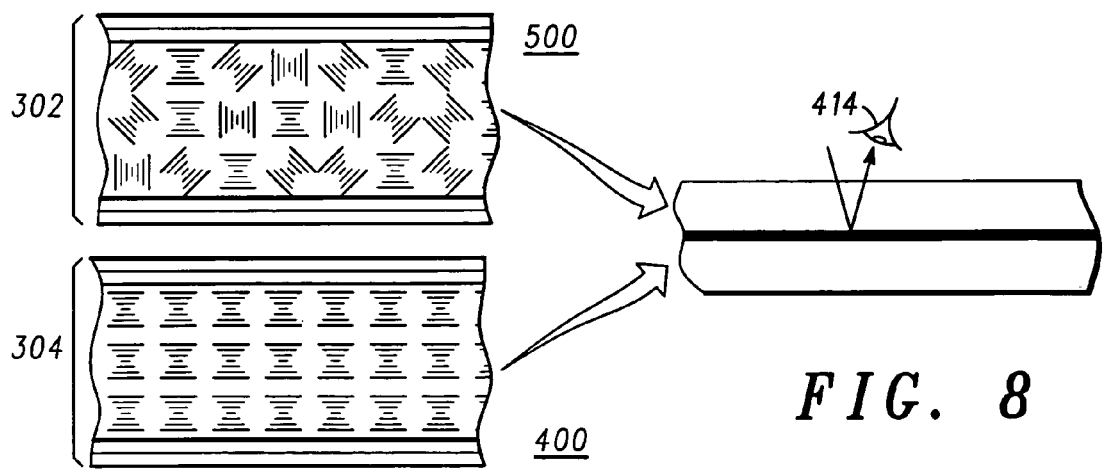
FIG. 8 shows a diagram illustrating how the different cholesteric display layers of FIGS. 4-5 are arranged to produce the display-input apparatus of FIG. 3, in accordance with an embodiment of the invention.

Referring briefly to FIG. 8, there is shown a diagram illustrating how two cholesteric display layers are arranged to produce the display-input apparatus as shown in FIG. 3. The first cholesteric display layer 302 is in a transmissive or non-reflective state, while the second cholesteric display layer 304 is displaying a character at the location where the user 414 is looking, and consequently light 416 incident at that location is reflected for the user to see. The light is only reflected by the region of the second cholesteric display layer that is between the character-shaped conductor element and other electrode for electrically stimulating the cholesteric molecules 407 therebetween.

Figure 6:
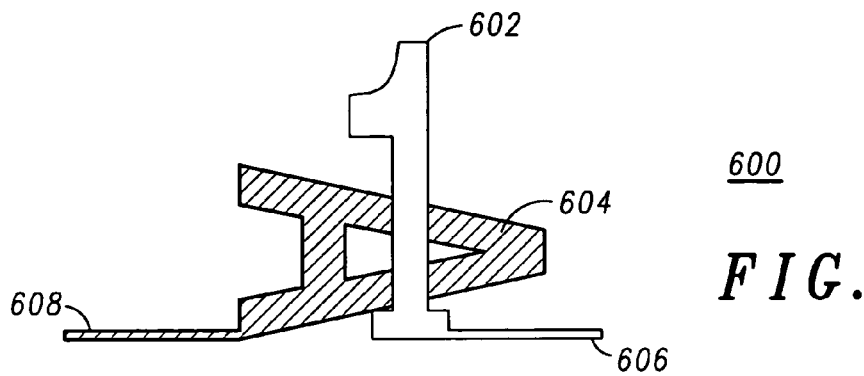
FIG. 6 shows first and second layers of characters as arranged in accordance with an embodiment of the invention.

Referring now to FIG. 6 which shows first and second layers of characters 600 as arranged in accordance with an embodiment of the invention. Specifically, a first character 602 and a second character 604 are character-shaped conductor elements formed with transparent conductor material. The character are shown as example of how two different character may appear in a coincident location. Each character shown would be part of a different cholesteric display layer, so the first character 602 ("1") may be shown on the first cholesteric display layer 302, and the second character 604 ("A") may be shown on the second cholesteric display layer 304. To electrify the character-shaped conductor elements, runners 606, 608 are conjoined with their respective conductor elements. The runners are connected to a controllable voltage source, as is known in the art. The conductor elements and runners may be formed by coating a substrate with transparent conductor material, and removing the conductor material other than that used to form the characters and runners. As shown here, the first and second characters are shown in different shades to indicate the characters that appear as a result of using the conductor elements in accordance with invention may appear in different colors.

Figure 7:
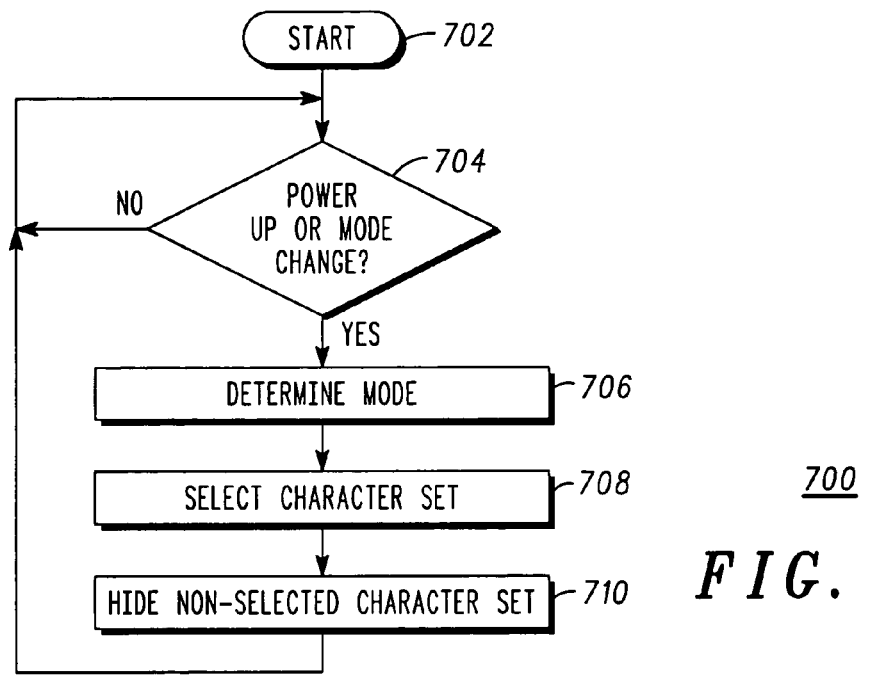
FIG. 7 shows a flow chart diagram of a method of operating a display-input apparatus for a portable electronic device in accordance with an embodiment of the invention.

Referring now to FIG. 7 which shows a flow chart diagram 700 of a method of operating a display-input apparatus for a portable electronic device in accordance with an embodiment of the invention. At the start 702 of the method, the device is powered-up by a user. In initiating the display-input apparatus, the device then detects the power-up event, or a mode change, at 704. The device then determines the desired mode of operation at 706, and selects the appropriate character set at 708. The non-selected character set is hidden by making it transparent at 710. Essentially, the selected mode of operation determines which cholesteric display layer will be active. The character layer, meaning the layer of conductor within the cholesteric display layer that comprises character-shaped conductor elements, is properly electrified to make characters appear in the cholesteric medium.

Thus the invention provides a display-input apparatus for a portable electronic device. The display-input apparatus includes a first cholesteric display layer for displaying a first character set, and a second cholesteric display layer for displaying a second character set. At least a portion of the first character set and the second character set are coincident. In the preferred embodiment of the invention, all conductor layers are made of a transparent conductor material, but it is contemplated that for the second, or lower cholesteric display layer, only the electrode must be made of transparent conductor as the lower electrode layer does not need to be transparent because the user will not generally be looking beyond that lowermost conductor layer. The first cholesteric display layer is operated in a transparent mode when the display is displaying the second character set, otherwise the user would not be able to see the second character set. Generally, each character set comprises at least one character, symbol, image, icon, or other indicia, or any combination thereof. The first character set and the second character set may be oriented differently so that the first character set is to be normally viewed from a first orientation and the second character set is to be normally viewed from a second orientation. The portable electronic device may comprise at least two body portions and may be physically configured into at least a first configuration corresponding to a first mode of operation, and a second configuration corresponding to a second mode of operation. When so implemented, the first character set is displayed when the portable electronic device is in the first configuration and the second character set is displayed when the portable electronic device is in the second configuration. Preferably the second cholesteric display layer is operated in a transparent state when the first cholesteric display layer is used to display the first character set. The first cholesteric display layer and the second cholesteric display layer may each be a different color. The display-input apparatus may further comprise a touch screen layer disposed on top of the first cholesteric display layer for detecting a tactile input location of a user.

The invention also provides a multi-configuration portable electronic device including a first body portion and a second body portion hingeably connected to the first body portion. The first and second body portions are moveable relative to each other so as to allow configuration of the multi-configuration portable electronic device into at least a first configuration and a second configuration. The first configuration is used when the multi-configuration portable electronic device is operated in a first mode of operation, and the second configuration is used when the multi-configuration portable electronic device is operated in a second mode of operation. A display-input apparatus is disposed in the second body portion.

The invention also provides a method of operating a display-input apparatus for a portable electronic device. The display-input apparatus has a first cholesteric display layer and a second cholesteric display layer. The first cholesteric display layer uses top and bottom electrodes made of transparent conductor, and the second cholesteric display layer has at least a top electrode made of transparent conductor. It is contemplated that the bottom electrode of the first cholesteric display layer may be commonly used as the top electrode of the second cholesteric display layer. The method includes arranging the first and second cholesteric display layers so that at least a portion of the second cholesteric display layer is only visible through the first cholesteric display layer when the display-input apparatus is mounted in the portable electronic device. The method commences by displaying a first character set on the first cholesteric display layer when the portable electronic device is operated in a first mode, or alternatively, displaying a second character set on the second cholesteric display layer when the portable electronic device is operated in a second mode. The method includes determining a present mode of operation, and displaying the appropriate character set from the first and second character sets.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, it is contemplated that the display-input apparatus may be used in a monolithic portable electronic device having a unitary body which may be used in multiple orientations, such as in a landscape orientation and a portrait orientation. The user may select different applications that are best suited for different orientations, and which in turn cause a different character set to be displayed to the user. The invention may also be used to display alternative character sets that are commonly oriented, but used with different applications on the electronic device.

What is claimed is:

1. A display-input apparatus for a portable electronic device, comprising:
   a first cholesteric display layer for displaying a first character set, and having top and bottom electrode elements made of transparent conductor, wherein the first character set comprises a plurality of character-shaped conductor elements formed in either the top or bottom electrode elements of the first cholesteric display layer; and
   a second cholesteric display layer for displaying a second character set, wherein at least a portion of the first character set and the second character set are coincident, and having a top electrode made of transparent conductor, wherein the second character set comprises a plurality of character-shaped conductor elements formed in either the top or bottom electrode elements of the second cholesteric display layer;

wherein the first cholesteric display layer is operated in a transparent mode when the display-input apparatus is displaying the second character set to allow a user of the portable electronic device to see the second character set through the first cholesteric display layer.

2. A display-input apparatus as defined in claim 1, wherein the first character set and the second character set are oriented differently so that the first character set is to be normally viewed when the portable electronic device is configured in a first orientation and the second character set is to be normally viewed when the portable electronic device is configured in a second orientation.

3. A display-input apparatus as defined in claim 2, wherein, the portable electronic device housing the display input apparatus comprises at least two body portions and may be physically configured into at least a first configuration corresponding to a first mode of operation, and a second configuration corresponding to a second mode of operation, the first character set is displayed by the display input apparatus when the portable electronic device is in the first configuration and the second character set is displayed by the display input apparatus when the portable electronic device is in the second configuration.

4. A display-input apparatus as defined in claim 1, wherein the second cholesteric display layer is operated in a transparent state when the first cholesteric display layer is used to display the first character set.

5. A display-input apparatus as defined in claim 1, wherein the first cholesteric display layer and the second cholesteric layer are each a different color.

6. A display-input apparatus as defined in claim 1, further comprising a touch screen layer disposed on top of the first cholesteric display layer for detecting a tactile input location of a user.

7. A multi-configuration portable electronic device, comprising:
   a first body portion;
   a second body portion hingeably connected to the first body portion;
   wherein the first and second body portions are moveable relative to each other so as to allow configuration of the multi-configuration portable electronic device into at least a first configuration and a second configuration, and wherein the first configuration is used when the multi-configuration portable electronic device is operated in a first mode of operation, and the second configuration is used when the multi-configuration portable electronic device is operated in a second mode of operation; and
   a display-input apparatus disposed on the second body portion, the display-input apparatus comprising:
       a first cholesteric display layer for displaying a first character set when the multi-configuration portable electronic device is operated in the first mode of operation, wherein the first character set comprises a plurality of character-shaped conductor elements formed in either a top or a bottom electrode element of the first cholesteric display layer; and
       a second cholesteric display layer for displaying a second character set when multi-configuration portable electronic device is operated in the second mode of operation, wherein the first character set comprises a plurality of character-shaped conductor elements formed in either a top or a bottom electrode element of the first cholesteric display layer, wherein at least a portion of the first character set and the second character set are coincident
   wherein the first cholesteric display layer is operated in a transparent mode when the display-input apparatus is displaying the second character set to allow a user of the portable electronic device to see the second character set through the first cholesteric display layer.

8. A multi-configuration portable electronic device as defined in claim 7, wherein the first character set and the second character set are oriented differently so that the first character set is to be normally viewed when the portable electronic device is configured in a first orientation and the second character set is to be normally viewed when the portable electronic device is configured in a second orientation.

9. A multi-configuration portable electronic device as defined in claim 8, wherein the portable electronic device comprises at least two body portions and may be physically configured into at least a first configuration corresponding to a first mode of operation, and a second configuration corresponding to a second mode of operation, the first character set is displayed when the portable electronic device is in the first configuration and the second character set is displayed when the portable electronic device is in the second configuration.

10. A multi-configuration portable electronic device as defined in claim 7, wherein the second cholesteric display layer is operated in a transparent state when the first cholesteric display layer is used to display the first character set.

11. A multi-configuration portable electronic device as defined in claim 7, wherein the first cholesteric display layer and the second cholesteric display layer are each a different color.

12. A multi-configuration portable electronic device as defined in claim 7, further comprising a touch screen layer disposed on top of the first cholesteric display layer for detecting a tactile input location of a user.

* * * * *